(12) United States Patent
Lee et al.

(10) Patent No.: US 7,777,629 B2
(45) Date of Patent: Aug. 17, 2010

(54) APPARATUS AND METHOD FOR PREVENTING LOSS OF BAGGAGE USING RFID

(75) Inventors: Jun Seob Lee, Daejeon (KR); Yong Woon Kim, Cheonan (KR); Sang Keun Yoo, Daejeon (KR); Hyoung Jun Kim, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 233 days.

(21) Appl. No.: 11/917,575

(22) PCT Filed: Oct. 14, 2005

(86) PCT No.: PCT/KR2005/003433
§ 371 (c)(1),
(2), (4) Date: Dec. 14, 2007

(87) PCT Pub. No.: WO2006/135134
PCT Pub. Date: Dec. 21, 2006

(65) Prior Publication Data
US 2008/0204242 A1 Aug. 28, 2008

(30) Foreign Application Priority Data
Jun. 14, 2005 (KR) ...................... 10-2005-0051087

(51) Int. Cl.
*G08B 13/00* (2006.01)
(52) U.S. Cl. .................. 340/572.1; 340/10.1; 340/10.5
(58) Field of Classification Search .................. 340/572, 340/10, 505
See application file for complete search history.

(56) References Cited

U.S. PATENT DOCUMENTS

| 6,044,353 | A | * | 3/2000 | Pugliese, III | .................... 705/5 |
| 7,193,515 | B1 | * | 3/2007 | Roberts et al. | ........... 340/568.1 |
| 2003/0189094 | A1 | * | 10/2003 | Trabitz | ....................... 235/385 |
| 2004/0124982 | A1 | * | 7/2004 | Kovach | ................... 340/572.1 |

(Continued)

FOREIGN PATENT DOCUMENTS

JP 2002-362730 12/2002

OTHER PUBLICATIONS

International Search Report for Application No. PCT/KR2005/003433, dated Mar. 14, 2006.

*Primary Examiner*—Travis R Hunnings
(74) *Attorney, Agent, or Firm*—Lahive & Cockfield, LLP; EuiHoon Lee, Esq.

(57) ABSTRACT

Provided is an apparatus and method for preventing air baggage from getting lost using a radio frequency identification (RFID) system. The apparatus for preventing baggage from getting lost, change, or stolen in which a baggage tag storing baggage management information is attached to the baggage and a receipt tag storing the baggage management information is issued to a baggage owner, the apparatus includes: a tag reader reading the receipt tag and the baggage tag in a predetermined area; and a determiner determining whether the tag reader reads the receipt tag including the same baggage management information as the baggage management information of the baggage tag within a predetermined time before and after the tag reader reads the baggage tag. As a result, air baggage is quickly and exactly managed, costs is reduced, and foreign confidence of an airport is increased, thereby preventing baggage from getting lost and exchanged.

12 Claims, 2 Drawing Sheets

U.S. PATENT DOCUMENTS

| | | | |
|---|---|---|---|
| 2005/0078006 A1* | 4/2005 | Hutchins et al. | 340/561 |
| 2006/0220857 A1* | 10/2006 | August et al. | 340/572.1 |
| 2009/0015398 A1* | 1/2009 | Bhogal et al. | 340/539.13 |
| 2009/0040048 A1* | 2/2009 | Locker et al. | 340/572.1 |
| 2009/0091452 A1* | 4/2009 | Himmel | 340/572.1 |

* cited by examiner

APPARATUS AND METHOD FOR PREVENTING LOSS OF BAGGAGE USING RFID

TECHNICAL FIELD

The present invention relates to an apparatus and method for preventing air baggage from getting lost using a radio frequency identification (RFID) system.

BACKGROUND ART

Radio frequency identification (RFID) technology has been rapidly developed to expand intelligent networking of distribution/logistics and from human-oriented information to object-oriented information in replacement of barcodes.

RFID is used to automatically recognize information on a variety of objects in a contactless manner, such as by using radio waves in a ubiquitous networking environment.

RFID is a new transponder technology for the contactless recognition of objects. The heart of RFID is the so-called RFID tag, a small computer chip with a miniature antenna. When the chip receives a radio signal from a reading device, it automatically transmits the stored data wirelessly according to different radio frequencies through a network to an information processing system such as a host computer based on radio frequencies.

An RFID system comprises tags, tag readers, and a host computer (application software). A tag consists of an RF, a memory, and an antenna (or power). The RFID system sends ID information stored in the memory of the tag using the RF.

An object for which the ID information stored in the memory of the tag is interfaced using the RF, its application method, and various applications of the RFID system according to a given environment are commercialized.

Many airliners have managed air baggage using barcodes and now introduce the RFID system to easily manage air baggage owing to the development of RFID technology.

DISCLOSURE OF INVENTION

Technical Problem

Barcodes are used to prevent air baggage from getting lost, changed, or stolen by identifying a barcode of a passenger's baggage receipt and a barcode attached to the baggage when the baggage is transferred to the outside of an airport from a baggage arrival area of the airport. However, barcodes require a manual operation for each baggage.

Technical Solution

To solve the problem, RFID is required to prevent baggage from getting lost, changed, or stolen, and to quickly and exactly manage baggage, thereby reducing costs and increasing a confidence of an airport.

ADVANTAGEOUS EFFECTS

The present invention prevents air baggage from getting lost, changed, or stolen using a RFID system. The apparatus and method for preventing baggage from getting lost according to the present invention quickly and exactly manage baggage, thereby reducing costs and increasing a confidence of an airport.

A conventional manual operation using barcodes is replaced with an automatic operation, thereby significantly reducing human power and costs.

A receipt tag is correlated with a plurality of baggage tags, thereby reducing costs to issue tags.

A tag reader can read many passenger's tags at a time, thereby reducing an operation time.

DESCRIPTION OF DRAWINGS

The above and other features and advantages of the present invention will become more apparent by describing in detail embodiments thereof with reference to the attached drawings in which.

BEST MODE

Figure 1:
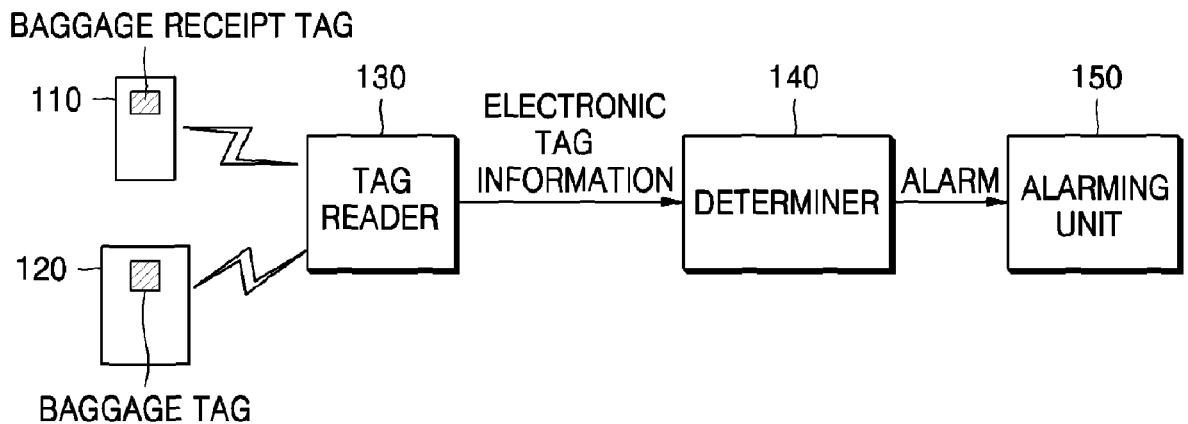
FIG. 1 is a block diagram of an apparatus for preventing baggage from getting lost according to an embodiment of the present invention.

The present invention provides an apparatus and method for preventing baggage from getting lost, changed, or stolen by means of baggage tags and receipt tags based on RFID information.

According to an aspect of the present invention, there is provided a n apparatus for preventing baggage from getting lost, changed, or stolen in which a baggage tag storing baggage management information is attached to baggage and a receipt tag storing the baggage management information is issued to a baggage owner, the apparatus comprising: a tag reader reading the receipt tag and the baggage tag in a predetermined area; and a determiner determining whether the tag reader reads the receipt tag including the same baggage management information as the baggage management information of the baggage tag within a predetermined time before and after the tag reader reads the baggage tag.

The determiner may comprise: an alarming unit giving an alarm if the determiner determines that the receipt tag is not read by the tag reader within the predetermined time before and after the baggage tag is read by the tag reader in which the receipt tag includes baggage management information corresponding to baggage management information of the baggage tag.

The baggage tag may further comprise information of baggage sequence number indicating which number baggage to which the baggage tag is attached has in numbers of all the baggage, and the receipt tag further comprises information of the total number of every baggage.

The alarming unit may issue an alarm if the determiner determines that the number of pieces of baggage recorded in baggage tag read by the tag reader does not correspond to the number of pieces of baggage stored in the receipt tag within a pre-determined time before and after the tag reader reads the receipt tag.

According to another aspect of the present invention, there is provided a method of preventing baggage from getting lost, change, or stolen, the method comprising:

(a) reading a baggage tag which stores baggage management information and attached to the baggage and a receipt tag which stores the baggage management information and attached to a receipt within a predetermined area; and (b) determining whether the receipt tag including the same baggage management information as the baggage management information of the baggage tag is read within a predetermined time before and after the baggage tag is read.

According to still another aspect of the present invention, there is provided a computer readable medium having embodied thereon a computer program for executing the method of preventing baggage from getting lost, change, or stolen.

MODE FOR INVENTION

The present invention will now be described more fully with reference to the accompanying drawings in which embodiments of the present invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

FIG. 1 is a block diagram of an apparatus for preventing baggage from getting lost, changed, or stolen according to an embodiment of the present invention. Referring to FIG. 1, the apparatus for preventing baggage from getting lost using electronic tags includes a tag reader 130 that reads a receipt tag 110 attached to a baggage receipt, a baggage tag 120 attached to the baggage, and code information of electronic tags in wired/wireless, a determiner 140 that determines whether a passenger carries out his/her baggage based on code information of the receipt tag 110 and the baggage tag 120 read by the tag reader 130, and an alarming unit 150 to emit an alarm in response to an alarm signal from the determiner 140.

The receipt tag 110 and the baggage tag 120 are correlated to each other. The receipt tag 110 can be correlated with a plurality of baggage tags 120 attached to a plurality of pieces of baggage.

In detail, the correlation between the receipt tag 110 and the baggage tag 120 forms 1:1 and 1:n. Therefore, only one receipt tag 110 is issued, resulting in a reduction of costs required to issue tags.

The receipt tag 110 and the baggage tag 120 include baggage management information. The baggage management information includes name of baggage owners, boarding date, air flight information, invoice number, destination, and other information required to manage air baggage.

The baggage tag 120 further includes baggage sequence number information indicating which number baggage to which the baggage tag 120 is attached has in numbers of all the baggage. The receipt tag 110 further includes every baggage number information.

For example, in case of four pieces of baggage, each of the baggage tags 120 further includes baggage sequential number information. e.g., 1/4 indicating the first baggage in the four pieces of baggage, 2/4 indicating the second baggage in the four pieces of baggage, etc. The receipt tag 110 further includes all baggage number information, e.g., four.

The receipt tag 110 and the baggage tag 120 include additional information used to identify a receipt tag attached to a baggage receipt and a baggage tag attached to the baggage.

The tag reader 130 reads baggage management information stored in the receipt tag 110 and the baggage tag 120 in a predetermined area using radio frequency (RF) and transmits the read codes to the determiner 140 in a wired/wireless manner.

The tag reader 130 can be a radio frequency identification (RFID) reader that transmits and receives RF signals and decodes data.

The determiner 140 determines whether the baggage is unlawfully carried out by another person based on the baggage management information stored in the receipt tag 110 and the baggage tag 120. If the baggage is determined to be unlawfully carried out, requests the alarming unit 150 to issue an alarm.

The determiner 140 requests the alarming unit 150 to issue the alarm if baggage owner identification information is not read from the receipt tag 110 within a pre-determined time before and after the baggage management information is read from the baggage tag 120.

The determiner 140 also requests an alarm from the alarming unit 150 if the number of pieces of baggage in the baggage tag 120 read by the tag reader 130 does not correspond to the number of pieces of baggage in the receipt tag 110.

When the alarming unit 150 receives a request from the determiner 140 to give an alarm and transmit a notice message indicating that the baggage is unlawfully carried out and lost, the alarming unit 150 outputs a predetermined alarming sound using a speaker and/or displays a predetermined message on a display device, thereby preventing baggage from getting unlawfully carried out and lost.

However, the alarming unit 150 is not restricted to the above embodiment but can be applied various embodiments.

Figure 2:
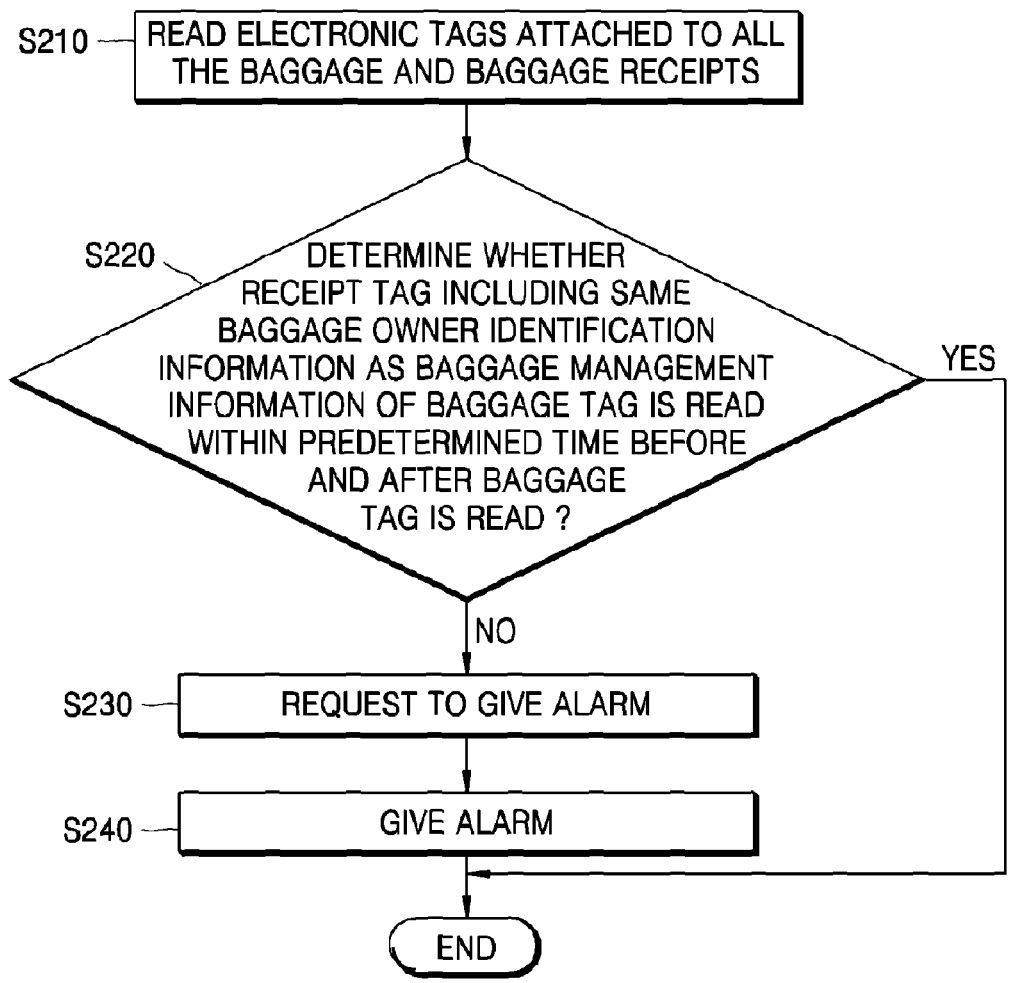
FIG. 2 is a flowchart of a method of determining whether baggage is unlawfully carried out according to an embodiment of the present invention.

FIG. 2 is a flowchart of a method of determining whether baggage is unlawfully carried out according to an embodiment of the present invention. Referring to FIG. 2, the tag reader 130 reads electronic tags attached to all pieces of the baggage and baggage receipts in a wired/wireless manner (Operation S210).

The determiner 140 determines whether the receipt tag 110 including the same baggage owner identification information as baggage management information of the baggage tag 120 is read within a predetermined time before and after the baggage tag 120 is read (Operation S220).

If the receipt tag 110 and the baggage tag 120 that include the same baggage owner identification information are not read simultaneously or within a predetermined time, or the number of pieces of baggage stored in the baggage tag 120 read by the tag reader 130 does not correspond to the number of pieces of baggage stored in the receipt tag 110, the determiner requests the alarming unit 150 to issue an alarm (Operation S230) and the alarming unit 150 gives an alarm (Operation 240).

Figure 3:
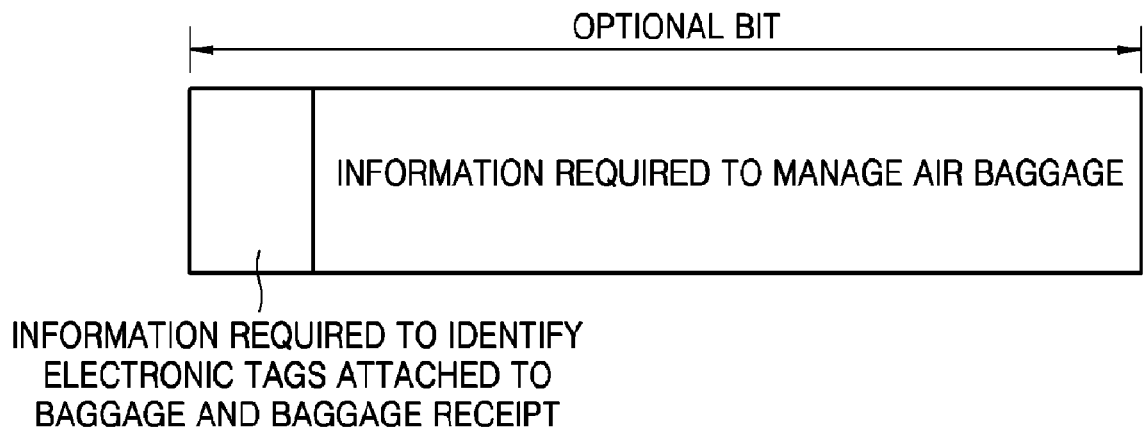
FIG. 3 illustrates an information type of an electronic tag according to an embodiment of the present invention.

FIG. 3 illustrates an information type of an electronic tag according to an embodiment of the present invention. Referring to FIG. 3, the electronic tag uses RFID tags, and the receipt tag 11 and the baggage tag 120 include baggage management information.

The electronic tag includes boarding dates, air flight information, passenger information, other information required to manage air baggage, and additional information required to identify the receipt tag 110 and the baggage tag 120. Refer to FIG. 1 for more detailed description.

Figure 4:
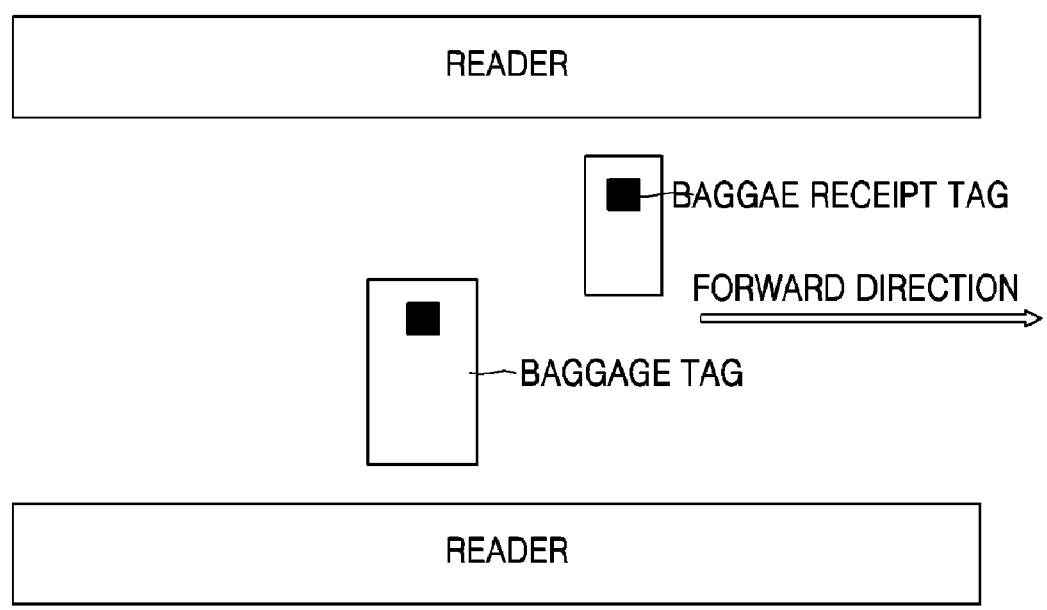
FIG. 4 illustrates a baggage carrying-out process according to an embodiment of the present invention.

FIG. 4 illustrates a baggage carrying-out process according to an embodiment of the present invention. Referring to FIG. 4, the receipt tag 110 and the baggage tag 120 are not read simultaneously but within a predetermined time, such that the tag reader 130 can read many passenger's tags at a time.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention prevents air baggage from getting lost, changed, or stolen using a RFID system. The apparatus and method for preventing baggage from getting lost according to the present invention quickly and exactly manage baggage, thereby reducing costs and increasing a confidence of an airport.

A conventional manual operation using barcodes is replaced with an automatic operation, thereby significantly reducing human power and costs.

A receipt tag is correlated with a plurality of baggage tags, thereby reducing costs to issue tags.

A tag reader can read many passenger's tags at a time, thereby reducing an operation time.

The invention claimed is:

1. An apparatus for preventing baggage from getting lost, changed, or stolen in which a baggage tag storing baggage management information is attached to baggage and a receipt tag storing the baggage management information is issued to a baggage owner, the apparatus comprising:
   a tag reader reading the receipt tag and the baggage tag in a predetermined area; and
   a determiner determining whether the tag reader reads the receipt tag including the same baggage management information as the baggage management information of the baggage tag within a predetermined time before and after the tag reader reads the baggage tag,
   wherein the baggage tag further comprises information of baggage sequence number indicating which number baggage to which the baggage tag is attached has in numbers of all the baggage, and the receipt tag further comprises information of the total number of every baggage.

2. The apparatus of claim 1, wherein the determiner comprises:
   an alarming unit giving an alarm if the determiner determines that the receipt tag is not read by the tag reader within the predetermined time before and after the baggage tag is read by the tag reader in which the receipt tag includes baggage management information corresponding to baggage management information of the baggage tag.

3. The apparatus of claim 1, wherein the alarming unit issues an alarm if the determiner determines that the number of pieces of baggage recorded in baggage tag read by the tag reader does not correspond to the number of pieces of baggage stored in the receipt tag within a predetermined time before and after the tag reader reads the receipt tag.

4. The apparatus of claim 1, wherein the baggage management information includes at least one of baggage owner's name, boarding date, air flight information, invoice number, and destination.

5. The apparatus of claim 1, wherein the receipt tag and the baggage tag are radio frequency identification (RFID) tags.

6. The apparatus of claim 1, wherein the tag reader is an RFID reader.

7. The apparatus of claim 1, wherein the predetermined area is an airport area where a baggage owner carries his baggage.

8. A method of preventing baggage from getting lost, changed, or stolen the method comprising:
   (a) reading a baggage tag which stores baggage management information and attached to the baggage and a receipt tag which stores the baggage management information and attached to a receipt within a predetermined area; and
   (b) determining whether the receipt tag including the same baggage management information as the baggage management information of the baggage tag is read within a predetermined time before and after the baggage tag is read,
   wherein the baggage tag further comprises information of baggage sequence number indicating which number baggage to which the baggage tag is attached has in numbers of all the baggage, and the receipt tag further comprises information of the total number of every baggage.

9. The method of claim 8, further comprising:
   issuing an alarm if it is determined that the receipt tag is not read by the tag reader within the pre-determined time before and after the baggage tag is read by the tag reader in which the receipt tag includes baggage management information corresponding to baggage management information of the baggage tag.

10. The method of claim 8, wherein the baggage tag further comprises information of baggage sequence number indicating which number baggage to which the baggage tag is attached has in numbers of all the baggage, and the receipt tag further comprises information of the total number of every baggage.

11. The method of claim 10, further comprising:
    issuing an alarm if it is determined that the number of the baggage tag correspond to the number of all the baggage of the receipt tag is not read within a predetermined time before and after the receipt tag is read.

12. The method of claim 8, wherein the baggage management information includes at least one of baggage owner's name, boarding date, air flight information, invoice number, and destination.

* * * * *